Patented May 8, 1945

2,375,534

UNITED STATES PATENT OFFICE 2,375,534

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application December 10, 1943, Serial No. 513,779

11 Claims. (Cl. 252—341)

This invention relates primarily to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude oil and relatively soft waters or brines. Controlled emulsion and subsequent demulsification under the conditions just mentioned, is of significant value in removing impurities, particularly inorganic salts, from pipe line oil.

The compounds herein described, that are used as the demulsifier of my process, consist of reaction products derived by reaction between (A) A polybasic carboxy acid compound characterized by (a) the presence of at least one free carboxyl radical or its obvious equivalent; (b) the absence of any hydroxy fatty acid radical as a substituent for an acidic hydrogen atom of any carboxyl radical; and (c) the absence of any polyhydric alcohol radical as a substituent for an acidic hydrogen atom of any carboxyl radical if said polyhydric alcohol radical is also united with one or more monobasic carboxy detergent-forming acid radicals; and (B) One or more of the hereinafter described acylated and oxyalkylated derivatives of 5-amino-1,3-dioxanes having the structural formula:

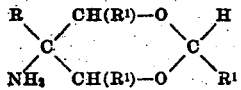

wherein R is a member of the class consisting of hydrogen, alkyl, and alpha-hydroxyalkyl, R¹ is a member of the class consisting of hydrogen, alkyl, aryl, and furyl, with the added proviso that such dioxane derivative contain at least one unreacted alcoholic hydroxyl radical.

Chemical products or compounds of the kind above referred to are obtained by acylation and oxyalkylation. The acyl group can be introduced as part of an amido radical or as part of an ester radical, and is obtained from a monocarboxy acid or equivalent having an acyl radical containing an unbroken chain or at least 8 carbon atoms. In other words, such acyl radical may appear as an amido radical or as an acyloxy radical. For example, an aminodioxane of the type previously described may be reacted with a higher fatty acid so as to form an amide. The amide so obtained may be subjected to oxyalkylation, particularly oxyethylation. Similarly, the amide may be subjected to oxyalkylation first and then to acylation afterwards. Obviously, one can also prepare a type of compound having more than one high molal acyl radical present, and for that matter, one of such acyl radicals may be present in the ester form and the other in the amido form.

As to the manufacture of aminodioxanes which are one class of the reactants employed in the manufacture of the demulsifier employed in my process, reference is made to U. S. Patent No. 2,247,256, dated June 24, 1941, to Senkus; and to U. S. Patent No. 2,317,555, dated April 27, 1943, to Robinette. It is a matter of common knowledge that amino-dioxanes are made by condensing a nitroglycol with an aldehyde and reducing the condensation product. The synthesis of such compounds is demonstrated by the following reactions:

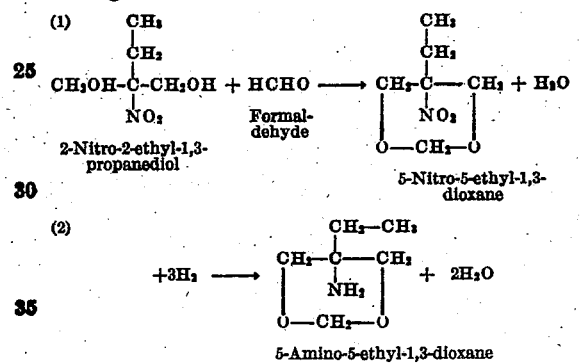

It is well known that certain monocarboxy organic acids containing an unbroken chain of eight carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R²COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

In addition to synthetic carboxy acids obtained by the oxidation of paraffins or the like, there is the somewhat analogous class obtained by treating carbon dioxide or carbon monoxide in the presence of hydrogen or an olefine, with steam, or by causing a metallic alkoxide or a halogenated hydrocarbon to react with chloroacetic acid, or with potassium cyanide, and saponifying the product thus obtained. Such products or mixtures thereof, having at least 8 and not more than 32 carbon atoms and having at least one carboxy group or the equivalent thereof, are as suitable for use as the conventional detergent-forming monocarboxy acids, and another analogous class equally suitable, is the mixture of carboxylic acids obtained by the alkali treatment of alcohols of higher molecular weight formed in the catalytic hydrogenation of carbon monoxide.

Although any of the high molal monocarboxy acids can be converted into esters, amides or esteramides of the kind described, by conventional procedure, it is my preference to employ compounds derived from higher fattty acids, rather than petroleum acids, rosin acids, and the like. I have found that by far the most effective demulsifying agents are obtained from unsaturated fatty acids having 18 carbon atoms. Such unsaturated fatty acids include the higher fatty acids, such as oleic acid, ricinoleic acid, linoleic acid, linolenic acid, etc. One may employ mixed fatty acids, as, for example, the fatty acids obtained by hydrolysis of cottonseed oil, soyabean oil, corn oil, etc. The material, product, or compound that I prefer to use as the demulsifier in practising my herein described process for resolving petroleum emulsions, is obtained from unsaturated fatty acids, and more specifically, unsaturated fatty acids, containing a hydroxyl radical or unsaturated fatty acids which have been subjected to oxidation.

Previous attention has been directed to the fact that one class of reactants included the aminodioxanes. Some of the aminodioxanes may contain a hydroxy hydrocarbon radical susceptible to oxyalkylation.

As examples of the 5-amino-1,3-dioxanes which may be included are the 2-phenyl-5-amino-1,3-dioxanes, the 2-(3-heptyl)-5-amino-1,3-dioxanes, and the 2-propyl-5-amino-1,3-dioxanes, which have the following structural formulas:

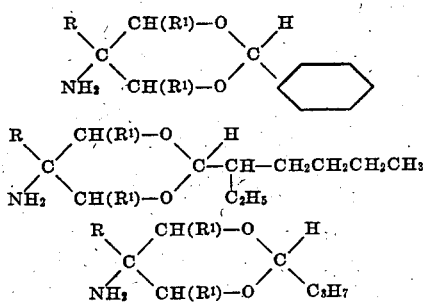

wherein R may represent hydrogen, alkyl, or alpha-hydroxyalkyl, and $R^1$ may be either hydrogen, alkyl, aryl, or furyl.

As to aminodioxanes containing a hydroxy alkyl group, and particularly a hydroxymethyl group, reference is made to the substituted 1,3-dioxanes which may be represented by the following formula:

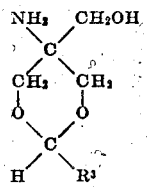

wherein $R^3$ represents an alkyl group, and particularly one having at least five carbon atoms.

As specific examples of the substituted 1,3-dioxanes which are included by the above generic formula, there may be mentioned 5-amino-2-(3-pentyl)-5-hydroxymethyl-1,3-dioxane; 5-amino-2-hexyl-5-hydroxymethyl-1,3-dioxane; 5-amino-2(3-heptyl)-5-hydroxymethyl-1,3-dioxane; 5-amino-2-hendecyl-5-hydroxymethyl-1,3-dioxane; 5-amino-2-octyl-5-hydroxymethyl-1,3-dioxane, and the like.

As specific examples of the preferred reagents, the following are included:

5-amino-2-(3-amyl)-5-hydroxymethyl-1,3-dioxane
5-amino-2-hexyl-5-hydroxymethyl-1,3-dioxane
5-amino-2-(3-heptyl)-5-hydroxymethyl-1,3-dioxane
2-propyl-5-hydroxy-methyl-5-amino-1,3-dioxane
2-propyl-5-methyl-5-amino-1,3-dioxane
2-(3-heptyl)-5-methyl-5-amino-1,3-dioxane
2-phenyl-5-methyl-5-amino-1,3-dioxane
5-ethyl-5-amino-1,3-dioxane The oxyalkylation of compounds having a labile hydrogen atom is a well known procedure. For instance, the procedure of subjecting amines, amides, phenols or alcohols to the action of an oxyalkylating agent so as to introduce a repetitious ether linkage between the oxygen atom or nitrogen atom and the labile hydrogen atom is well known. In view of what is said hereinafter, it is obvious that the oxyalkylation of the 5-amino-1,3-dioxanes, or the amide derived therefrom, is simply a sub-generic aspect of the well known methods which contemplate oxyalkylation of amines, amides and alcohols, regardless of source or chemical structure.

Oxyalkylating agents are those containing a reactive ethylene oxide ring. As typical examples of applicable compounds may be mentioned epichlorhydrin, glycid alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc. I particularly prefer to employ oxyalkylating agents having two and not more than four carbon atoms, such as ethylene oxide, propylene oxide, butylene oxide, glycid and methylglycid. My particularly preferred oxalkylating agent is ethylene oxide.

Other halogenated epoxides which are the functional equivalents of epichlorhydrin are described in U. S. Patent No. 2,321,037, dated June 8, 1943, to Marple and Evans.

For the sake of brevity, subsequent examples are concerned largely with derivatives in which the high molal acyl radical is derived from higher fatty acids. Attention is directed to the prior description of other equally suitable high molal acids.

AMIDE

Example 1

1 pound mole of 2-propyl-5-hydroxy-methyl-5-amino-1,3-dioxane is reacted with 1 pound mole of ricinoleic acid, or a suitable equivalent, such as 1 pound mole of ethyl ricinoleate or one-third pound mole of triricinolein, so as to produce the corresponding amide. The reaction between the amine and the acid is conducted in the conventional manner. The two reactants are mixed together at a temperature above the boiling point of water, which expedites the removal of water of reaction. The elimination of water is hastened by constant stirring during the period of reaction. Reaction takes place at comparatively low temperatures, for instance 130–145° C., and is expedited at high temperatures, for instance, 160–180° C. In absence of pyrolysis, and especially when a glyceride is heated in absence of a solvent, one can use a temperature as high as 220° C. to 240° C., and speed up the reaction and increase the yield of amide. In any event, the temperature employed for amidification must be below the pyrolytic point of the reactants. The passage of a dried inert gas through the reaction mass during amidification, hastens the reaction, and also tends to decrease any unreacted material. The completion of the reaction can be determined in any convenient manner, such as a titration test to determine elimination, or substantial reduction, in the amount of basic amine present.

Reaction is generally complete within three hours if higher temperatures are used, and even under conditions which cause the reaction to take place more slowly, reaction time need never exceed 10–20 hours. The use of some other equivalent rather than a fatty acid, involves conventional changes in the amidification procedure. For instance, the use of an ethyl ester results in the evolution or elimination of ethyl alcohol instead of water. Similarly, ricinoleoamide may be employed as an acylating agent with the evolution of ammonia. All such procedures are comparable with that employed for the acylation of somewhat similar cyclic amines having homocyclic radicals, for instance, cyclohexylamine, benzylamine, aniline, etc. Sometimes amidification is conveniently conducted in the presence of an inert solvent, for instance, xylene, which is permitted to distil off during the reaction and assists in the elimination of water. Xylene and water vapors are condensed, separated, and the xylene returned to the reaction chamber for re-use. Such inert solvent must be immiscible with the vapors being removed, for instance, water, and must be miscible with both reactants. Furthermore, it must be readily volatilized at a temperature below the pyrolytic point of the reactants. Such use is conventional in connection with esterification hereinafter referred to. Any procedure employed must guard against loss of amine during amidification, or else an excess of the amine must be employed and subsequently must be recovered. If a glyceride is used, and in many ways this is the most desirable procedure, one must remove the glycerol formed by a salt water wash or the like. The use of the glyceride keeps ester formation, by reaction with the hydroxy methyl group at a minimum.

AMIDE

Example 2

1 pound mole of 2-propyl-5-methyl-5-amino-1,3-dioxane is substituted for 1 pound mole of 2-propyl-5-hydroxy-methyl-5-amino-1,3-dioxane in the preceding Example 1.

AMIDE

Example 3

The same procedure is followed as in preceding examples, except that the raw material employed is 2-(3-heptyl)-5-methyl-5-amino-1,3-dioxane.

AMIDE

Example 4

The same procedure is followed as in preceding examples, except that the raw material employed is 2-phenyl-5-methyl-5-amino-1,3-dioxane.

AMIDE

Example 5

The same procedure is followed as in preceding examples, except that the raw material employed is 5-ethyl-5-amino-1,3-dioxane.

AMIDE

Example 6

The same procedure is followed as in preceding examples, except that the raw material employed is 5-amino-2-(3-amyl)-5-hydroxymethyl-1,3-dioxane.

AMIDE

Example 7

The same procedure is followed as in preceding examples, except that the raw material employed is 5-amino-2-hexyl-5-hydroxymethyl-1,3-dioxane.

AMIDE

Example 8

The same procedure is followed as in preceding examples, except that the raw material employed is 5-amino-2-(3-heptyl)-5-hydroxymethyl-1,3-dioxane.

AMIDE

Example 9

Oleic acid, olein or oleyl chloride is substituted for ricinoleic acid in Examples 1 to 8, preceding.

AMIDE

Example 10

Lauric acid, laurin or lauryl chloride is substituted for ricinoleic acid in Examples 1 to 8, preceding.

OXYALKYLATED 5-AMINO-1,3-DIOXANES

Example 1

1 pound mole of 2-propyl-5-hydroxy-methyl-5-amino-1,3-dioxane is oxyalkylated with four pound moles of ethylene oxide. The oxyethylation is conducted in a closed vessel in a stepwise manner. 1 pound mole of ethylene oxide is added to 1 pound mole of the aminodioxane. One-half of 1% of sodium methylate is added as a catalyst. The reaction takes place readily, particularly at temperatures moderately above the boiling point of water. For instance, 130° C. If the reaction does not take place readily at this temperature, one may employ a somewhat higher temperature, for instance, between 140–150° C. In any event, it is best to conduct the reaction in such a manner that there is no pressure, due to unreacted ethylene oxide, or other oxyalkylating agent, of more than 200 pounds. This may be accomplished by using less ethylene oxide, e. g., one-half pound mole for the first portion instead of one mole. 1 mole of ethylene oxide should be absorbed readily within 2-8 hours, when reaction is complete, as indicated by a drop in gauge pressure, due to the absorption of the ethylene oxide; a second portion of the reactant, for instance, another mole of ethylene oxide, is added and reacted in the same manner. The same procedure is employed so as to introduce the third mole of ethylene oxide. Three moles of ethylene oxide per mole of aminodioxane should be introduced without difficulty in not over 24 hours, and in many instances, can be introduced in one-third such time. Speed of reaction is dependent, in part, on effectiveness of stirring or agitation, insofar that the reaction may take place largely at interfacial surfaces.

OXYALKYLATED 5-AMINO-1,3-DIOXANE

Example 2

The seven other aminodioxanes specifically mentioned as reactants in "Amide, Examples 2-8," inclusive, are substituted for 2-propyl-5-hydroxy-methyl-5-amino-1,3-dioxane in "Oxyalkylated 5-amino-1,3-dioxane, Example 1," preceding.

OXYALKYLATED 5-AMINO-1,3-DIOXANE

Example 3

The same procedure is followed as in Examples 1 and 2, immediately preceding, except that 8 moles of ethylene oxide are introduced per mole of aminodioxane instead of 4 moles.

OXYALKYLATED 5-AMINO-1,3-DIOXANE

Example 4

The same procedure is followed as in Examples 1 and 2, immediately preceding, except that 12 moles of ethylene oxide are introduced per mole of aminodioxane instead of 4 moles.

OXYALKYLATED 5-AMINO-1,3-DIOXANE

Example 5

The same procedure is employed as in Examples 1 to 4, immediately preceding, except that propylene oxide is substituted for ethylene oxide. Propylene oxide is less reactive than ethylene oxide, and it may be necessary to use a somewhat higher temperature of reaction and a somewhat longer period of reaction. Such increases in temperature and time of reaction, as compared with ethylene oxide, are only moderate. Even greater amounts of the alkylene oxide, for instance, 18-24 moles per mole of amine may be used. In the case of a hydroxylated amine, 24-36 moles may be used.

Attention is directed to the fact that previous examples exemplifying amides or oxyalkylated aminodioxanes, represent intermediates. The remaining series of examples all represent new compositions of matter. They are conveniently divided into three classes, to wit: oxyalkylated amides, esters, and ester amides. These subdivisions are preserved in the subsequent subject-matter for convenience.

OXYALKYLATED AMIDE

Example 1

1 pound mole of the amide derived from the selected aminodioxane, as described in "Amide, Example 1," preceding, is treated with an oxyalkylating agent in the same manner as employed for the oxyalkylation of amides derived from various primary amines, such as the amides of cyclohexylamine, benzylamine, aniline, and various alkylamines having 6-10 carbon atoms, such as octylamine. The oxyalkylation of high molal amides is well known and requires no elaboration. In general, the procedure which I prefer to employ is substantially that described in the oxyalkylation of the unamidified aminodioxanes in the preceding examples, except that the temperature of oxyalkylation in the initial stages must be sufficient to insure that the amide is a liquid, and particularly so, when derived from high molal saturated acids such as stearic acid. From 6 to 12 moles of the alkylene oxide are used per mole of amide, as a minimum, and as many as 20 moles as a maximum. If a hydroxylated amide, derived from a hydroxylated amine is used, or for that matter, in other instances, one may use 12 to 18 moles of the alkylene oxide per mole of amine. Even higher ratios may be employed if desired.

The introduction of the oxyalkylene radical almost invariably yields a more fluid product, i. e., a product having a lower melting point. Thus, the temperature of reaction employed in oxyalkylation can be reduced after the initial reaction has taken place, i. e., after partial oxyalkylation.

There is no objection to employing an inert solvent during the early stages of oxyalkylation, although such solvent may, in a few instances, cease to be a solvent after partial oxyalkylation takes place, and thus, would have to be removed as a matter of convenience, during the later stages of oxyalkylation. Such solvent, however, would serve its purpose, because when removed, the partially oxyalkylated mass should be substantially fluid. This is readily understandable by reference to an analogy where a solid such as lecithin is dissolved in xylene and subjected to oxyethylation. As oxyethylation proceeds, the product usually becomes xylene-insoluble. Under such circumstances, it is generally better to remove the xylene before proceeding with the further oxyethylation of the fluid derivative. Many, in fact, the majority of reactants described, can be sufficiently oxyethylated without xylene removal. Oxyalkylation of the aminodioxane can be conducted as a rule, without a catalyst, if desired. It is preferable, however, to have a catalyst present in the oxyalkylation of an amide. One-half of one percent of sodium methylate or other alkali will serve. The oxyalkylation of an amide may take considerably longer and may take definitely high temperatures of reaction. As far as practical, it is better to employ the same temperature and pressures as described in connection with the oxyalkylation of the aminodioxanes, as previously described, except that the time of reaction may be doubled or tripled. If, however, the reaction does not go rapidly enough, under such circumstances, then increased temperatures short of a pyrolytic point may be used, but the preference, particularly when employing ethylene oxide, should be to not exceed 250-300 pounds gauge pressure. It is again pointed out that this entire procedure is the one that is used in the conventional oxyalkylation of amides, and may be varied to conform to such procedure.

OXYALKYLATED AMIDE

Example 2

The same procedure is employed as in the oxyalkylation of aminodioxane, except that as much as 18 to 24 moles of the alkylene oxide may be introduced per mole of amide.

Oxyalkylated Amide

Example 3

Instead of employing an amide of the kind exemplified by "Amide, Example 1," there is used instead amides exemplified by Examples 2 to 10, inclusive.

Ester

Example 1

1 pound mole of the oxyethylated aminodioxane described under "Oxyalkylated aminodioxane, Example 1," preceding, is esterified with 1 pound mole of ricinoleic acid or ethyl ricinoleate in the conventional manner. The procedure employed is the same as that employed for the esterification of triethanolamine, or particularly triethanolamine, which has first been treated with several moles, for instance, 3–9 moles of ethylene oxide. Since the reaction is conducted in the absence of catalysts which usually are employed in esterification, such as benzene sulfonic acid, or the like, it is necessary to use a fairly high temperature, and generally speaking, one employs a temperature just short of the pyrolytic point, for instance, from 185° C. to just short of 200° C. Even a higher temperature, for instance, 240°–250° C., can be employed, provided there is no pyrolysis. If desired, the reaction can be hastened, and, for that matter, conducted at a somewhat lower temperature, by the use of an ester or amide as the acylating agent, and also by passage of a dried inert gas, such as nitrogen, through the reaction mass while subjected to constant agitation. The reaction is generally complete in 3–5 hours as a minimum period of time, and may take 12–18 hours in some instances.

Ester

Example 2

Other oxyalkylated aminodioxanes, as described under the headings "Oxyalkylated aminodioxanes, Examples 2 to 5" are substituted for the particular oxyalkylated aminodioxane described in the preceding example.

Ester Amide

Example 1

1 pound mole of the oxyethylated amide obtained by oxyethylation of 1 pound mole of the amide derived by reaction between 1 pound mole of 5 - amino-2-(3-amyl)-5-hydroxymethyl - 1,3 dioxane and 1 pound mole of ricinoleic acid, followed by reaction with 6 pound moles of ethylene oxide, is reacted with 1 pound mole of oleyl chloride.

Ester Amide

Example 2

The same procedure is followed, except that lauryl chloride is substituted for oleyl chloride in Example 1, immediately preceding.

Ester Amide

Example 3

Ricinoleyl chloride is substituted for oleyl chloride.

Ester Amide

Example 4

The same procedure is followed as in the three examples immediately preceding, except that 5- amino-2-hexyl-5-hydroxymethyl-1,3-dioxane and 5-amino -2- (3 heptyl) -5- hydroxymethyl -1,3- dioxane are substituted for 5-amino-2-3-amyl)-5-hydroxymethyl-1,3-dioxane.

The production of esters of higher fatty acids by use of the acyl chloride as a reactant is well known and requires no description. The same procedure is followed, as, for example, in the reaction between glycerol and oleyl chloride. If desired, esterification in the preceding examples may be conducted by means of the acids instead of the acyl chlorides, and may also be conducted in the presence of a conventional esterification catalyst, such as sulfuric acid, benzene sulfonic acid, or dry hydrochloric acid gas. Oxyalkylated amides of the kind described seem to esterify a little less readily than the usual alcohols. However, any conventional procedure can be employed, and particularly one may employ the use of an inert solvent, such as xylene, in the manner previously mentioned in regard to amidification. The temperature of esterification is not determined by the presence of an inert solvent, such as xylene, and may vary between 120–180° C., or even higher. Time of esterification may vary from 3–30 hours. Procedure has already been indicated for hastening esterification reactions. See U. S. Patents Nos. 2,075,107, dated March 30, 1937, to Frazier, and 2,264,759, dated December 2, 1941, to Jones.

Incidentally, it is obvious that certain variants may be employed, without detracting from the general nature of the new chemical products or compounds herein described. For instance, the selected aminodioxane might be treated with a low molal carboxy acid having less than seven carbon atoms, such as acetic acid, hydroxyacetic acid, lactic acid, butyric acid, etc. The amide of the low molal acids so obtained could be subjected to oxyalkylation, and then subsequently subjected to esterification, with a high molal carboxy acid in the manner described. Similarly, the aminodioxane, and especially the examples in which there is no hydroxymethyl group, could be subjected to the action of any conventional alkylating agent, such as an alkyl halide, benzyl chloride, methyl sulfate, or the like, so as to produce a secondary amine. Such secondary amine could be subjected to oxyalkylation in the manner previously described, and subsequently esterified with a high molal acid. Similarly, an amide derived from aminodioxane having a hydroxymethyl group, might be subjected to treatment in the manner described in U. S. Patent No. 2,151,788, dated March 28, 1939, to Mauersberger. In certain of the types of compounds previously described, there is no acyl radical directly attached to the amino nitrogen atom. Such products show basicity comparable to triethanolamine or esterified triethanolamine, or the esters of oxyethylated triethanolamine. Where such basicity exists, obviously the product can be used in the form of a salt, as well as in the form of the free base, or hydrate, i. e., combination with water. Salts of lactic acid, acetic acid, nitric acid, etc., are particularly valuable for various purposes hereinafter indicated.

Purely by way of illustration, although the previous descriptive matter has clearly indicated the nature of the reactants and resultants, the following formulas are included. All the various radicals indicated by R, R' and R² have their previous significance. The ethylene radical may be replaced by propylene, hydroxypropylene, butylene, etc.

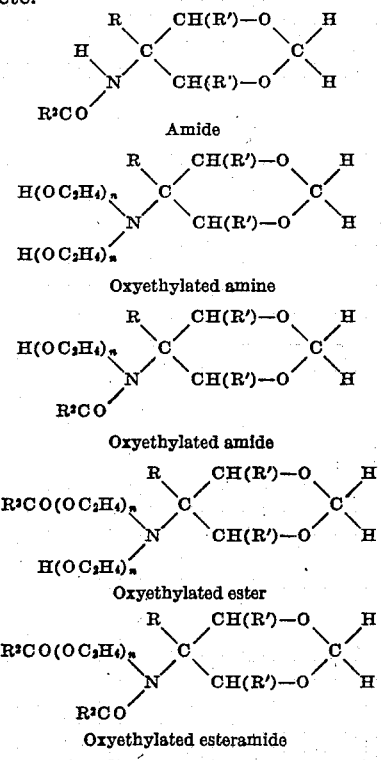

Amide

Oxyethylated amine

Oxyethylated amide

Oxyethylated ester

Oxyethylated esteramide

If the aminodioxane is hydroxylated, the derivative may be further complicated by the presence of three hydroxyethyl radicals, thus:

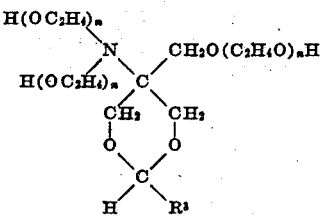

In all the above $n$ varies from 3 to 12.

The following are examples of new products or compounds contemplated by my invention:

COMPOSITION OF MATTER

*Example 1*

One pound mole of a material exemplified by "Oxyalkylated Amide, Example 1," preceding, is esterified with one pound mole of phthalic anhydride. The reaction is conducted at approximately 160–180° for 2 to 5 hours, until analysis shows that one carboxyl has been eliminated by esterification.

COMPOSITION OF MATTER

*Example 2*

The same procedure is employed as in the preceding example, except that materials of the kind exemplified by "Oxyalkylated amide, Example 2" and "Oxyalkylated amide, Example 3" are substituted in place of a material described under the heading "Oxyalkylated amide, Example 1."

COMPOSITION OF MATTER

*Example 3*

The same procedure is employed as in the previous two examples, except that one employs one mole of the material described under the heading "Ester, Example 1," or "Ester, Example 2" instead of the reactants described under the heading "Oxyalkylated amide, Example 1," "Oxyalkylated amide, Example 2" and "Oxyalkylated amide, Example 3."

COMPOSITION OF MATTER

*Example 4*

The same procedure is followed as in the first two examples preceding, except that a material of the kind exemplified by "Ester amide, Example 1," "Ester amide, Example 2," "Ester amide, Example 3," and "Ester amide, Example 4" is substituted instead of reactants described under the headings "Oxyalkylated amide, Example 1," "Oxyalkylated amide, Example 2" and "Oxyalkylated amide, Example 3."

COMPOSITION OF MATTER

*Example 5*

The same procedure is followed as in Examples 1 to 4, immediately preceding, except that maleic anhydride, adipic acid, citraconic anhydride, succinic acid, or some other polybasic acid, particularly a dibasic acid, is substituted for phthalic anhydride in the preceding examples. If the reaction involves the use of an acid instead of an anhydride, then such reaction can be conducted in the presence of an inert solvent, such as xylene, which removes the water in a slow but continuous manner.

The acylated and oxyalkylated aminodioxane of the kind previously described, must contain at least one, and preferably more than one, alcoholic hydroxyl radical. Such reactant may be considered for the sake of simplicity as being in the class of an alcohol, i. e., a monohydric or polyhydric alcohol. If an alcohol is indicated by the formula $Y'(OH)_n$, where $n$ indicates the number 1 or more, and if a polybasic acid body be indicated by the formula $X'(COOH)_n$, where $n$ indicates the number 2 or more, then the reaction between a monohydric alcohol and a polybasic acid will result in a compound which may be indicated by the following formula:

$$YX(COOH)_{n'}$$

where $n'$ indicates the number 1 or more, and which is in reality a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed phthalic anhydride, then examination reveals that the formulas might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals, or there might be both. This is indicated by the following:

$$(Y.X)_q(OH)_{n'}$$
$$(Y.X)_q(COOH)_{m'}$$
$$(OH)_{n''}(YX)_q(COOH)_{m''}$$

in which $q$ indicates a small whole number (one in the case of a monomer, and probably not over 20, and usually less than 10), and $m'$ and $n'$ indicate the number 1 or more, and $m''$ and $n''$ indicate zero or a small or moderately-sized whole number, such as zero, one or more, but in any event, probably a number not in excess of 40. Naturally, each residual hydroxyl could combine with phthalic acid or its equivalent, or with a tribasic acid, such as critic acid; and in such event, there would be a large number of free or uncombined carboxyl radicals present, possibly 1 to 20, or more. Actually, the preferable type of reagent would be more apt to include less than 10, and in fact, less than 5 free hydroxyl radicals. It is not necessary to remark that the residual carboxyl radicals can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexanolamine, benzylamine, aniline, toluidine, etc. Conversion into the ester would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like. One could employ an amino alcohol so as to produce an ester.

If a tricarboxy acid, such as citric acid, is employed, then at least theoretically two moles of the aminodioxane derivative might react with one mole of the citric acid compound. Similarly, as has already been pointed out, a large number of molecules of a polybasic acid compound might combine with a single molecule of a highly hydroxylated methylene aminodioxane. For practical purposes, however, I have found that the most desirable products are obtained by combinations, in which the ratio of aminodioxane derivative to the polybasic acid is within the ratio of 3 to 1 and 1 to 5, and in which the molecular weight of the resultant product does not exceed 10,000, and is usually less than 5,000, or perhaps less than 3,000. This is particularly true, if the resultant product is soluble to a fairly definite extent, for instance, at least 5%, in some solvent, such as water, alcohol, benzene, dichlorethyl ether, acetone, cresylic acid, or the like. This is simply another way of stating that it is preferable, if the product be one of the sub-resins, which are commonly referred to as an A resin, or B resin, as distinguished from a C resin, which is a highly infusible, insoluble resin (see Ellis, Chemistry of Synthetic Resins, 1935, page 862, et seq.).

In recapitulating what has been said previously, the sub-resinous, semi-resinous, or resinous product herein contemplated may be indicated by the following formula:

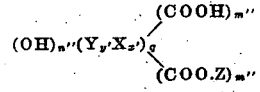

in which the characters have their previous significance, any $y'$ represents a small whole number not greater than 3, and $x'$ represents a small whole number not greater than 5; Z represents a hydrogen ion equivalent, such as a metallic atom, organic radical, etc.

My preferred reagent for reaction with polycarboxy acid is selected from one of the various types in which there is present a basic amino nitrogen atom. The expression "basic amino nitrogen" is used in its conventional sense.

"Unsaturated groups, or negative groups, if substituted for one or more of the hydrogens on ammonia, reduce the basicity of the nitrogen atom to a remarkable degree. In general, the presence of one negative group linked on the nitrogen is sufficient to destroy the ordinary basic properties." (Textbook of Organic Chemistry, Richter, 2nd edition, page 253.)

Reference to an amine and amino compound is intended to include the salts and the anhydro base, as well as the hydrated base, since both obviously are present when a water-containing emulsion is treated with an amine or amino compound.

"In an aqueous solution of the amine the anhydro base, R—NH₂, the hydrated base,

and the two ions are all present." (Richter, v. s. page 252.)

In the hereto appended claims reference to radicals derived from olefine oxides is intended to include glycid. In other words, in the case of propylene oxide, it is intended that hydroxy propylene oxide be included.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

A somewhat analogous use of my demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

Reference is made to my co-pending applications Serial Nos. 513,780 and 513,781, filed December 10, 1943.

Demulsification, as contemplated in the hereto appended claims, includes the preventive step of commingling the demulsifier with an aqueous component, which would or might subsequently become either phase of the emulsion, in absence of such precautionary measure.

I direct attention to my pending application Serial No. 546,744, filed July 26, 1944, wherein the materials used as the demulsifier in my herein described process, are claimed as new compositions of matter.

Having thus described my invention, what I claim as new and desire to secure by Letters Patent is:

1. A process for resolving petroleum emulsions of the water-in-oil type, characterized by subjecting the emulsion to the action of a demulsifier, comprising a sub-resinous esterification product of the formula:

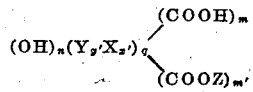

in which $y'$ represents a small whole number varying from 1 to 3, and $x'$ represents a small whole number varying from 1 to 5, and $n$, $m$ and $m'$ indicate small whole numbers such as 0, 1, or more, but not in excess of 40; $q$ indicates a small whole number varying from 1 to 20; Z is a hydrogen ion equivalent; Y is the radical of an acylated and oxyalkylated derivative of 5-amino-1,3-dioxanes having the structural formula:

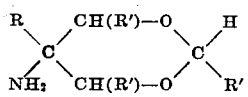

wherein R is a member of the class consisting of hydrogen, alkyl, and alpha-hydroxyalkyl, R' is a member of the class consisting of hydrogen, alkyl, aryl, and furyl; and having at least one acyl radical derived from a detergent-forming monocarboxy acid having at least 8 and not more than 32 carbon atoms and at least one occurrence of the monovalent radical $(OC_{n'}H_{2n'})_{m''}H$, where $n'$ is 2 to 10, and $m''$ is 3 to 20; and X is the residue of a polybasic carboxy acid compound characterised by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

2. The process of claim 1, wherein the polybasic carboxy acid radicals are limited to the dicarboxy species.

3. The process of claim 1, wherein the polybasic carboxy acid radicals are limited to the dicarboxy species and at least one occurence of the detergent-forming acid radicals is limited to the high fatty acid species.

4. The process of claim 1, wherein the polybasic carboxy acid radicals are limited to the dicarboxy species and at least one occurrence of the detergent-forming acid radicals is limited to the unsaturated fatty acid species.

5. The process of claim 1, wherein the polybasic carboxy acid radicals are limited to the dicarboxy species and at least one occurrence of the detergent-forming acid radicals is limited to the unsaturated fatty acid species, having 18 carbon atoms.

6. The process of claim 1, wherein the polybasic carboxy acid radicals are limited to the dicarboxy species and at least one occurrence of the detergent-forming acid radicals is limited to ricinoleic acid radicals.

7. The process of claim 1, wherein the polybasic carboxy acid radicals are limited to the dicarboxy species and all occurrences of the detergent-forming acid radical are limited to ricinoleic acid radical.

8. The process of claim 1, wherein the polybasic carboxy acid radicals are limited to the dicarboxy species and all occurrences of the detergent-forming acid radical are limited to ricinoleic acid radical and wherein $n'$ is at least 2 and not over 4.

9. The process of claim 1, wherein the polybasic carboxy acid radicals are limited to the dicarboxy species and all occurrences of the detergent-forming acid radical are limited to ricinoleic acid radical and wherein $n'$ is 2, and the oxyethylated aminodioxane radical is part of an amide radical.

10. The process of claim 1, wherein the polybasic carboxy acid radicals are limited to the dicarboxy species and all occurrences of the detergent-forming acid radical are limited to ricinoleic acid radical and wherein $n'$ is 2, and the oxyethylated aminodioxane radical is part of an ester radical.

11. The process of claim 1, wherein the polybasic carboxy acid radicals are limited to the dicarboxy species and all occurrences of the detergent-forming acid radical are limited to ricinoleic acid radical and wherein $n'$ is 2, and the oxyethylated aminodioxane radical is part of an esteramide radical.

MELVIN DE GROOTE.